United States Patent
Goda et al.

(10) Patent No.: US 9,731,153 B2
(45) Date of Patent: Aug. 15, 2017

(54) APPARATUS AND METHOD FOR SUPPORTING DISTRIBUTION FROM AIRCRAFT

(71) Applicants: ShinMaywa Industries, Ltd., Hyogo (JP); JAPAN AEROSPACE EXPLORATION AGENCY, Tokyo (JP)

(72) Inventors: Yushi Goda, Hyogo (JP); Tsubasa Yamada, Hyogo (JP); Masatoshi Arimoto, Hyogo (JP); Shinji Tagawa, Hyogo (JP); Taiki Nakaie, Hyogo (JP); Jun Adachi, Hyogo (JP); Takeshi Ito, Tokyo (JP); Koji Muraoka, Tokyo (JP); Kohei Funabiki, Tokyo (JP); Yuichi Matsuo, Tokyo (JP)

(73) Assignees: ShinMaywa Industries, Ltd., Hyogo (JP); Japan Aerospace Exploration Agency, Tokyo (JP)

( * ) Notice: Subject to any disclaimer, the term of this patent is extended or adjusted under 35 U.S.C. 154(b) by 356 days.

(21) Appl. No.: 14/259,400

(22) Filed: Apr. 23, 2014

(65) Prior Publication Data

US 2014/0240147 A1    Aug. 28, 2014

Related U.S. Application Data

(63) Continuation of application No. PCT/JP2012/006745, filed on Oct. 22, 2012.

(30) Foreign Application Priority Data

Oct. 24, 2011    (JP) ................................. 2011-232894

(51) Int. Cl.
   *B64D 1/00*    (2006.01)
   *A62C 3/02*    (2006.01)
   (Continued)

(52) U.S. Cl.
   CPC .......... *A62C 3/0242* (2013.01); *A62C 3/0228* (2013.01); *A62C 3/0292* (2013.01);
   (Continued)

(58) Field of Classification Search
   CPC ....... A62C 3/0228; A62C 3/035; A62C 3/042; A62C 3/025; A62C 3/0235; A62C 3/0242;
   (Continued)

(56) References Cited

U.S. PATENT DOCUMENTS 2,730,402 A * 1/1956 Whiting, Jr. ............. B64D 1/16
                                                      239/171
5,794,889 A    8/1998 Bailey
(Continued)

FOREIGN PATENT DOCUMENTS

EP    2 145 823 A2    1/2010
JP    62-69100    3/1987
(Continued)

OTHER PUBLICATIONS

Extended European Search Report for corresponding European Application No. 12843433.9 dated May 18, 2015.
(Continued)

*Primary Examiner* — Van Trieu
(74) *Attorney, Agent, or Firm* — Renner, Otto, Boisselle & Sklar, LLP

(57) ABSTRACT

When distribution material is distributed over a target site on a ground surface from an aircraft, a distribution supporting apparatus offers support information to a pilot dropping the distribution material to efficiently distribute the distribution material. The distribution supporting apparatus includes: an input section to which information items on at least an aircraft velocity, an aircraft altitude, and a wind velocity are input; a computation section configured to compute a loca-
(Continued)

Figure 1:
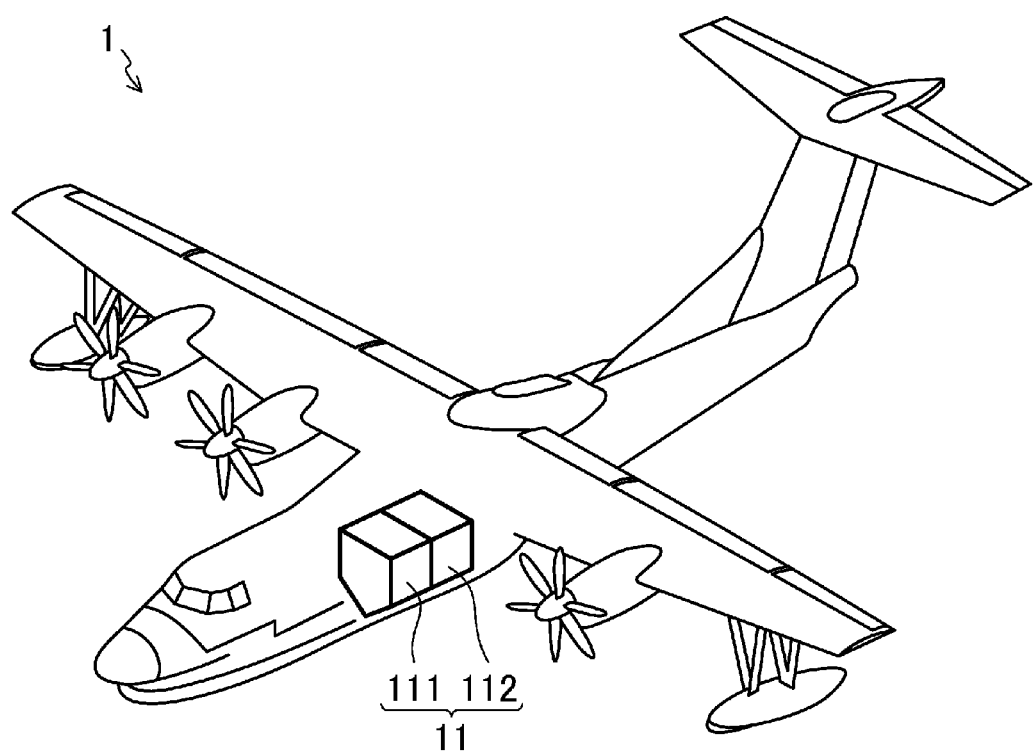

tion at which the distribution material dropped from the aircraft arrives on the ground surface and a density distribution of the distribution material on the ground surface based on the information items input to the input section; and a display control section configured to display, on a display, the support information relating to the location and density distribution computed by the computation section.

10 Claims, 8 Drawing Sheets

(51) Int. Cl.
- B64D 1/16 (2006.01)
- F41G 9/00 (2006.01)
- G01C 23/00 (2006.01)
- B64D 45/00 (2006.01)
- B64D 43/00 (2006.01)

(52) U.S. Cl.
CPC ............... *B64D 1/16* (2013.01); *B64D 43/00* (2013.01); *B64D 45/00* (2013.01); *F41G 9/002* (2013.01); *G01C 23/00* (2013.01)

(58) Field of Classification Search
CPC .......... A62C 3/0292; B64D 1/16; B64D 1/00; B64D 43/00
See application file for complete search history.

(56) References Cited

U.S. PATENT DOCUMENTS

| | | | |
|---|---|---|---|
| 6,701,818 B1 | 3/2004 | O'Dwyer | |
| 7,284,727 B2 * | 10/2007 | Nolan | B64D 1/16 244/136 |
| 7,478,680 B2 * | 1/2009 | Sridharan | A62C 3/025 102/368 |
| 7,735,752 B1 | 6/2010 | Songer et al. | |
| 7,753,314 B2 * | 7/2010 | Nolan | B64D 1/16 239/171 |
| 8,165,731 B2 * | 4/2012 | Akcasu | A62C 3/025 102/367 |
| 2003/0010185 A1 | 1/2003 | O'Dwyer | |
| 2005/0022657 A1 | 2/2005 | O'Dwyer | |
| 2006/0162941 A1 * | 7/2006 | Sridharan | A62C 3/025 169/53 |
| 2007/0145191 A1 | 6/2007 | Smith et al. | |
| 2010/0065288 A1 * | 3/2010 | Akcasu | A62C 3/025 169/53 |
| 2010/0070111 A1 * | 3/2010 | Akcasu | A62C 3/025 701/3 |
| 2012/0280054 A1 * | 11/2012 | Gomez | B64D 1/16 239/1 |

FOREIGN PATENT DOCUMENTS

| | | |
|---|---|---|
| JP | 05-246394 | 9/1993 |
| JP | 08-324499 | 12/1996 |
| JP | 2002-541468 | 12/2002 |
| JP | 2003-154999 A | 5/2003 |
| JP | 2004-305805 | 11/2004 |
| JP | 2006-176073 | 7/2006 |

OTHER PUBLICATIONS

International Search Report for corresponding International Application No. PCT/JP2012/006745 mailed Nov. 20, 2012.
Form PCT/ISA/237 for corresponding International Application No. PCT/JP2012/006745 dated Nov. 20, 2012.
Extended European Search Report for corresponding European Application No. 15195192.8 dated Mar. 23, 2016.

* cited by examiner ced Patent Publication No. H08-324499, the location at
APPARATUS AND METHOD FOR SUPPORTING DISTRIBUTION FROM AIRCRAFT

CROSS-REFERENCE TO RELATED APPLICATIONS

This is a continuation of International Application No. PCT/JP2012/006745 filed on Oct. 22, 2012, which claims priority to Japanese Patent Application No. 2011-232894 filed on Oct. 24, 2011. The entire disclosures of these applications are incorporated by reference herein.

BACKGROUND

The present disclosure relates to aerial distribution supporting apparatuses and methods in which when distribution material is distributed over a target site on the ground surface from an aircraft, support information is offered to a pilot who drops the distribution material to efficiently distribute the distribution material.

Japanese Unexamined Patent Publication No. H08-324499 describes a fire helicopter for dropping a fire extinguishing agent, such as water, from the air to a widespread fire, such as a forest fire, or a fire that is difficult to be sprayed with water from the ground. The fire helicopter includes an apparatus for supporting the dropping of a fire extinguishing agent. The dropping supporting apparatus functions to compute the location at which the fire extinguishing agent to be dropped arrives based on information on the aircraft velocity and the aircraft altitude, and display the computed location superimposed on an image taken by a camera. This apparatus facilitates allowing the fire extinguishing agent to reach a fire site on the ground surface.

SUMMARY

Incidentally, in the technique described in Japanese Unexamined Patent Publication No. H08-324499, the location at which the fire extinguishing agent arrives is computed on the assumption that the fire extinguishing agent falls freely.

In contrast, when liquid, foam, or any other material, such as water or a fire extinguishing agent, in, for example, an airborne tank (hereinafter collectively referred to as distribution material) is distributed over a fire site on the ground surface to extinguish the fire, such distribution material splits into small liquid drops while falling, and the liquid drops are dispersed. This allows the distribution material dropped from an aircraft to be spread over a predetermined area of the ground surface.

Here, studies of inventors of this application have revealed that with increasing altitude from which distribution material is dropped, the area of the ground surface where the distribution material is spread (i.e., the distribution area) increases, and the density of the distribution material on the ground surface (i.e., the amount of the distribution material per unit length) decreases. On the other hand, the distribution material having a density higher than or equal to a predetermined density (e.g., 1.6 or more liters of water per square meter) is required to effectively extinguish a fire, and for this reason, when the altitude from which the distribution material is dropped is too high, this is disadvantageous for effectively extinguishing a fire.

When the altitude from which the distribution material is dropped is low, the distribution material density increases to help extinguish a fire, while the distribution area is reduced to decrease the area where a fire can be extinguished. This means that the distribution material must be dropped many times to extinguish the fire, and the efficiency of fire fighting, in particular, for a widespread fire decreases. A decrease in drop altitude is disadvantageous also in terms of the ensuring of the aircraft safety. Furthermore, when the drop altitude is too low, the distribution material, such as water, reaches the ground surface in massive form to adversely affect the safety on the ground surface.

Thus, when distribution material is distributed over a fire site on the ground surface from an aircraft, there exists the drop altitude allowing the area where the distribution material is distributed at a density higher than or equal to the distribution material density effective in extinguishing a fire (hereinafter referred to as the effective distribution density area) to be largest, and it is most efficient and safe to perform fire fighting in accordance with the drop altitude. Even if only the location at which a fire extinguishing agent arrives is computed on the assumption that the fire extinguishing agent falls freely similarly to the technique described in Japanese Unexamined Patent Publication No. H08-324499, efficient fire fighting is impossible unless consideration is given to the drop altitude.

It is therefore an object of the present disclosure to support a pilot to enable efficient and safe distribution of distribution material over a target site on the ground surface from an aircraft.

The present disclosure relates to an aerial distribution supporting apparatus which, when distribution material is distributed over a target site on a ground surface from an aircraft, offers support information to a pilot dropping the distribution material to efficiently distribute the distribution material.

The distribution supporting apparatus includes: an input section to which information items on at least a velocity and an altitude of the aircraft and a wind velocity are input; a computation section configured to compute a location at which the distribution material dropped from the aircraft arrives on the ground surface and a density distribution of the distribution material on the ground surface based on the information items input to the input section; and a display control section configured to display, on a display, the support information relating to the location and density distribution computed by the computation section.

Here, the type of the "aircraft" is not limited as long as it is a machine flying through the air, such as a plane or a helicopter. The "distribution material" herein is matter, such as liquid, foam, or powder, which, if dropped from the aircraft, splits and is dispersed while falling to exhibit a predetermined density distribution over a predetermined area when the matter has arrived at the ground surface. In other words, the distribution material has characteristics corresponding to the altitude from which the distribution material is dropped. Specifically, with increasing drop altitude, the area where the distribution material is distributed increases, and the distribution density decreases, and with decreasing drop altitude, the area where the distribution material is distributed decreases, and the distribution density increases. The distribution material corresponds to, for example, water or a fire extinguishing agent in a situation where the distribution supporting apparatus is utilized to extinguish a fire.

The phrase "efficiently distribute the distribution material" means that the distribution material is dropped such that the area where the distribution material is distributed at a desired density is largest. For example, in order to extinguish a fire, water, for example, is dropped such that the area where the distribution material is distributed at a density enabling the effective extinguishment of a fire is largest.

With the configuration, the information items on at least the aircraft velocity, the aircraft altitude, and the wind velocity are input to the input section of the distribution supporting apparatus. Here, the wind velocity may include a headwind/tailwind speed component corresponding to the direction of travel of the aircraft, and a crosswind speed component corresponding to a direction orthogonal to the direction of travel of the aircraft. The information items correspond to drop conditions on which the distribution material is dropped from the aircraft, and the drop conditions are associated with the location at which the distribution material arrives on the ground surface and the density distribution of the distribution material on the ground surface.

The computation section computes the location at which the distribution material arrives on the ground surface and the density distribution of the distribution material on the ground surface based on the input information items as described above. This means that the location at which the dropped distribution material is distributed and the amount of the dropped distribution material are grasped.

The display control section displays the support information relating to the computed location and density distribution on the display.

The support information displayed on the display include information items on not only the location at which the distribution material arrives, but also the density distribution of the distribution material associated with the drop altitude of the distribution material. Thus, the pilot drops the distribution material in accordance with the support information displayed on the display, thereby efficiently distributing the distribution material. The information item on the density distribution of the distribution material prevents the drop altitude from being lower than required, thereby ensuring the safety of flight.

The distribution material may be water or a fire extinguishing agent to be distributed over a fire site, an information item on a location of the fire site that is the target site may be further input to the input section, the computation section may compute, based on the input information items, a drop location and a drop altitude from which the distribution material is to be dropped and which enable distribution of the distribution material having a density higher than or equal to a density effective in extinguishing a fire over the fire site, and the display control section may display, on the display, information items on the drop location and the drop altitude from which the distribution material is to be dropped as the support information.

Specifically, assuming that the distribution material has been dropped, the area where the distribution material is distributed at a density higher than or equal to the density effective in extinguishing a fire (i.e., the effective distribution density area) and the location of the effective distribution density area can be computed based on the information items, such as the aircraft altitude, input to the input section. For this reason, conversely, information on the location of the fire site is identified to enable the computation of the drop location and drop altitude from which the distribution material is to be dropped and which enables distribution of the distribution material over the fire site at a density higher than or equal to the density effective in extinguishing a fire.

Thus, the computation section computes the drop location and drop altitude from which the distribution material is to be dropped, and the display control section displays information items on the drop location and drop altitude as the support information on the display. The pilot may fly the aircraft such that the aircraft arrives at the drop location and the drop altitude, and may drop the distribution material at the time when the aircraft has arrived at the drop location and the drop altitude. This allows an amount of the distribution material larger than or equal to the amount thereof effective in extinguishing a fire to be distributed over as broad an area of the fire site as possible, thereby efficiently extinguishing a fire.

An information item on an aircraft location may be further input to the input section, and the display control section may display, on the display, an information item on discrepancies between the aircraft location and the computed drop location and between the aircraft altitude and the computed drop altitude as the support information in real time.

If the pilot views information displayed on the display in real time while flying the aircraft to eliminate the discrepancies between the aircraft location and the computed drop location and between the aircraft altitude and the computed drop altitude, the aircraft arrives at the drop location and the drop altitude. The pilot drops the distribution material at the time when the aircraft has arrived at the drop location and the drop altitude, thereby enabling the distribution of an amount of the distribution material larger than or equal to the amount thereof effective in extinguishing a fire over as broad an area of the fire site as possible. This can reduce the burdens on the pilot, and enables efficient extinguishment of a fire.

An information item on an aircraft location may be further input to the input section, the computation section may further compute a path through which the aircraft reaches the drop location and the drop altitude, and the display control section may display, on the display, information items on the computed path and a time when the distribution material is to be dropped as the support information in real time.

Specifically, the display control section displays an information item on the computed path to the drop location and drop altitude from which the distribution material is to be dropped as the support information on the display in real time. The pilot flies the aircraft such that the aircraft travels along the displayed path, thereby allowing the aircraft to arrive at the drop location and the drop altitude. Since the display further displays an information item on the time when the distribution material is to be dropped as the support information, the pilot drops the distribution material in accordance with the information item. This allows the distribution material to be dropped at the drop location and the drop altitude, and thus, enables distribution of an amount of the distribution material larger than or equal to the amount thereof effective in extinguishing a fire over as broad an area of the fire site as possible. This can reduce the burdens on the pilot, and enables efficient extinguishment of a fire.

Here, the apparatus for supporting distribution from the aircraft may further include: a dropper configured to drop the distribution material when the aircraft has arrived at the drop location and the drop altitude.

Thus, if the pilot flies the aircraft such that the aircraft reaches the determined drop location and drop altitude, the dropper automatically drops the distribution material. This can significantly reduce the burdens on the pilot, and enables the precise distribution of the distribution material over the fire site. When not only the requirement that the aircraft have arrived at the drop location and the drop altitude, but also the requirement that the pilot allow the dropping, such as the requirement that the pilot turn on a drop switch, are satisfied, the dropper may drop the distribution material. In other words, when the aircraft has arrived at the drop location and the drop altitude in a situation where the drop switch is on, the dropper may drop the distribution material.

The distribution material may be water or a fire extinguishing agent to be distributed over a fire site, the computation section may compute an effective distribution density area in which the distribution material is distributed at a density higher than or equal to a density of the distribution material effective in extinguishing a fire, and a location of the effective distribution density area, and the display control section may display, on the display, the effective distribution density area obtained by dropping the distribution material at a present moment, and the location of the effective distribution density area as the support information in real time.

Thus, the display displays the effective distribution density area obtained by dropping the distribution material at the present moment, and the location of the effective distribution density area in real time while changing them with the movement of the aircraft. This allows the pilot to drop the distribution material based on these information items.

When, for example, a helmet mounted display or a head mounted display (HMD) or a head-up display (HUD) is utilized as the display, the outline of the effective distribution density area may be displayed to overlap the view out of the window of the aircraft. The pilot may fly the aircraft such that the visually checked fire site and the displayed effective distribution density area overlap each other, and may drop the distribution material at the time when they have overlapped each other. This allows an amount of the distribution material larger than or equal to the amount thereof effective in extinguishing a fire to be distributed over as broad an area of the fire site as possible, thereby efficiently extinguishing a fire. The display does not need to be the HMD or HUD, and the effective distribution density area may be displayed so as to be superimposed on a map showing, for example, the fire site.

The computation section may compute the location at which the distribution material arrives and the density distribution based on the input information items and previously determined table data.

Specifically, the behavior of the dropped distribution material is previously analyzed by utilizing, for example, a computational fluid dynamics (CFD) analysis, and information items on the location at which the distribution material arrives and the density distribution, which are based on the analyzed data, are defined as table data together with the drop conditions on which the distribution material is dropped. This allows the computation section to refer to the table data based on the input information items to calculate the location at which the distribution material arrives and the density distribution. When an information item on the fire site is input, the table data is referred to enable the computation of the drop location and drop altitude from which the distribution material is to be dropped.

Instead of the table data, a model expression obtained by modeling the behavior of dropped distribution material may be determined, and the computation section may compute the location at which the distribution material arrives and the density distribution based on the input information items and the model expression, or compute the drop location and drop altitude from which the distribution material is to be dropped based thereon.

The present disclosure also relates to an aerial distribution supporting method in which, when distribution material is distributed over a target site on a ground surface from an aircraft, support information is offered to a pilot dropping the distribution material to efficiently distribute the distribution material.

The method includes: inputting information items on at least a velocity and an altitude of the aircraft and a wind velocity; computing a location at which the distribution material dropped from the aircraft arrives on the ground surface and a density distribution of the distribution material on the ground surface based on the input information items; and displaying, on a display, the support information relating to the computed location and density distribution.

As described above, in the apparatus and method for supporting the distribution from the aircraft, a computation is performed on the location at which the distribution material arrives on the ground surface and the density distribution of the distribution material on the ground surface, and support information on the location at which the distribution material arrives and the density distribution of the distribution material is displayed on the display to allow the pilot to drop the distribution material in accordance with the support information displayed on the display, thereby efficiently distributing the distribution material.

BRIEF DESCRIPTION OF THE DRAWINGS

FIG. 1 is a perspective view illustrating a schematic configuration of a fire fighting flying boat.

FIG. 2 is a cross-sectional view of a tank aboard the fire fighting flying boat.

FIG. 3 is a functional block diagram illustrating the configuration of a fire fighting supporting apparatus.

FIG. 4 is a diagram illustrating an example screen displayed on an HMD in a water drop area display mode in which the area where water is dropped is displayed.

FIG. 5 is a conceptual diagram of the water drop area display mode.

FIG. 6 is a diagram illustrating an example screen displayed on the HMD in a water drop location display mode in which the location to which water is dropped is displayed.

FIG. 7 is a conceptual diagram of the water drop location display mode.

FIG. 8 is a diagram illustrating an example screen displayed on the HMD in a vector display mode in which a vector is displayed.

DETAILED DESCRIPTION

An embodiment of an apparatus for supporting distribution from an aircraft will be described hereinafter with reference to the drawings. The following embodiment is an example. FIG. 1 illustrates a fire fighting flying boat 1 in which a fire fighting supporting apparatus serving as a distribution supporting apparatus is used. The fire fighting flying boat 1 is utilized to extinguish a widespread fire, such as a forest fire or an industrial complex fire, from the air, or to precisely drop water from the air to, for example, a residential area. Although the detailed configuration of the fire fighting flying boat 1 is not shown, the fire fighting flying boat 1 is a plane capable of executing takeoffs from both the ground and water and landings thereon, and a middle lower portion of the bodywork of the fire fighting flying boat 1 includes a tank 11 configured to store water to enable the dropping of water from the air. The fire fighting flying boat 1 is configured to taxi on water, such as a lake or sea, to enable the introduction of water into the tank 11. Foam (a fire extinguishing agent) can be mixed into water in the tank 11.

Figure 2:
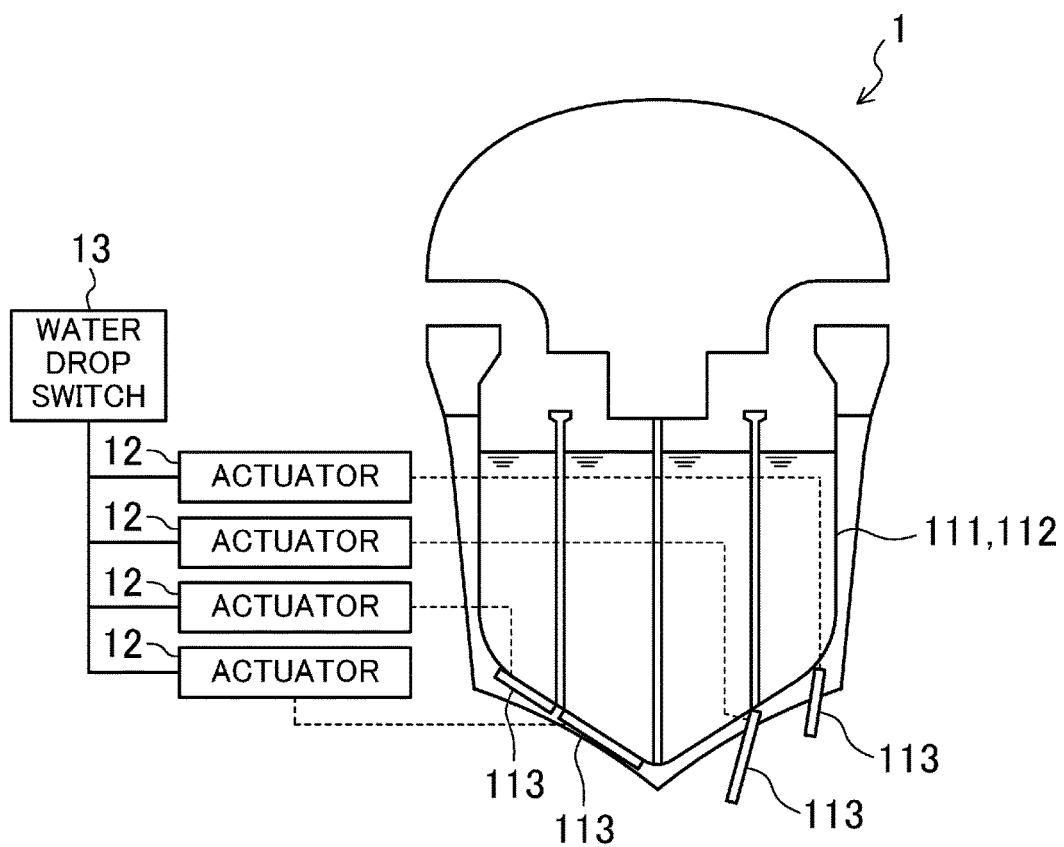

Here, as illustrated in FIG. 1, the tank 11 includes two tanks including a front tank 111 and a rear tank 112 that are arranged in a front-to-rear direction of the bodywork. As illustrated in FIG. 2, the interior of each of the tanks 111 and 112 is partitioned into four chambers. Lower portions of the chambers of each of the tanks 111 and 112 each include an openable/closable door 113. In this example figure, some of the doors 113 are illustrated in a closed position, and the other doors 113 are illustrated in an open position. Separately opening the doors 113 allows the fire fighting flying boat 1 to drop liquid or foam, such as water or a fire extinguishing agent, stored in a corresponding one or corresponding ones of a total of eight chambers. Although conceptually illustrated in FIG. 2, the doors 113 each include an actuator 12 configured to open or close the door 113, and a pilot operates a water drop switch 13 disposed inside the cockpit of the fire fighting flying boat 1, thereby allowing the actuator 12 to open or close a corresponding one of the doors 113. In other words, in the fire fighting flying boat 1, the pilot determines whether water is dropped, and determines the time when water is dropped. Although described in detail below, an automatic water drop operation in which the aircraft automatically drops water, or a semiautomatic water drop operation in which on condition that the pilot has operated the water drop switch 13, the aircraft automatically drops water may be used.

The doors 113 of the tank 11 are capable of not only separately opening, but also opening at the same time. The number of the door or doors 113 to be opened determines the amount of target water to be dropped. Opening the doors 113 at the same time helps initial fire fighting in which, for example, a fire is extinguished intensively at a fire site. Alternatively, the doors 113 can be successively opened. Successively opening the doors 113 enables a linear water drop corresponding to the flight path of the fire fighting flying boat 1. This helps form a firebreak. The following description is principally based on the initial fire fighting.

To drop water, the pilot determines the amount of target water to be dropped from the fire fighting flying boat 1. In this determination, for example, the amount of the target water may be directly selected, or the number of the door or doors 113 to be opened may be selected to determine the amount of the target water.

The capacity of the tank 11 is set at a relatively large capacity of, for example, about 15 tons, thereby allowing a relatively large amount of water to be dropped. Increasing the amount of the target water to be dropped at the same time reduces the spreading of water even in a situation where water is dropped from a high altitude. This can ensure the effective distribution density effective in extinguishing a fire although described in detail below. In other words, the altitude from which the fire fighting flying boat 1 drops water can be set at a relatively high altitude. This helps increase the fire fighting safety.

In contrast, with increasing altitude from which water is dropped, the degree of difficulty in precisely dropping water to a fire site on the ground surface increases. To address such a problem, the fire fighting flying boat 1 includes a fire fighting supporting apparatus 2 to precisely and appropriately drop water to the fire site to increase the fire fighting efficiency. The fire fighting supporting apparatus 2 is configured to offer support information on the dropping of water to the pilot.

Figure 3:
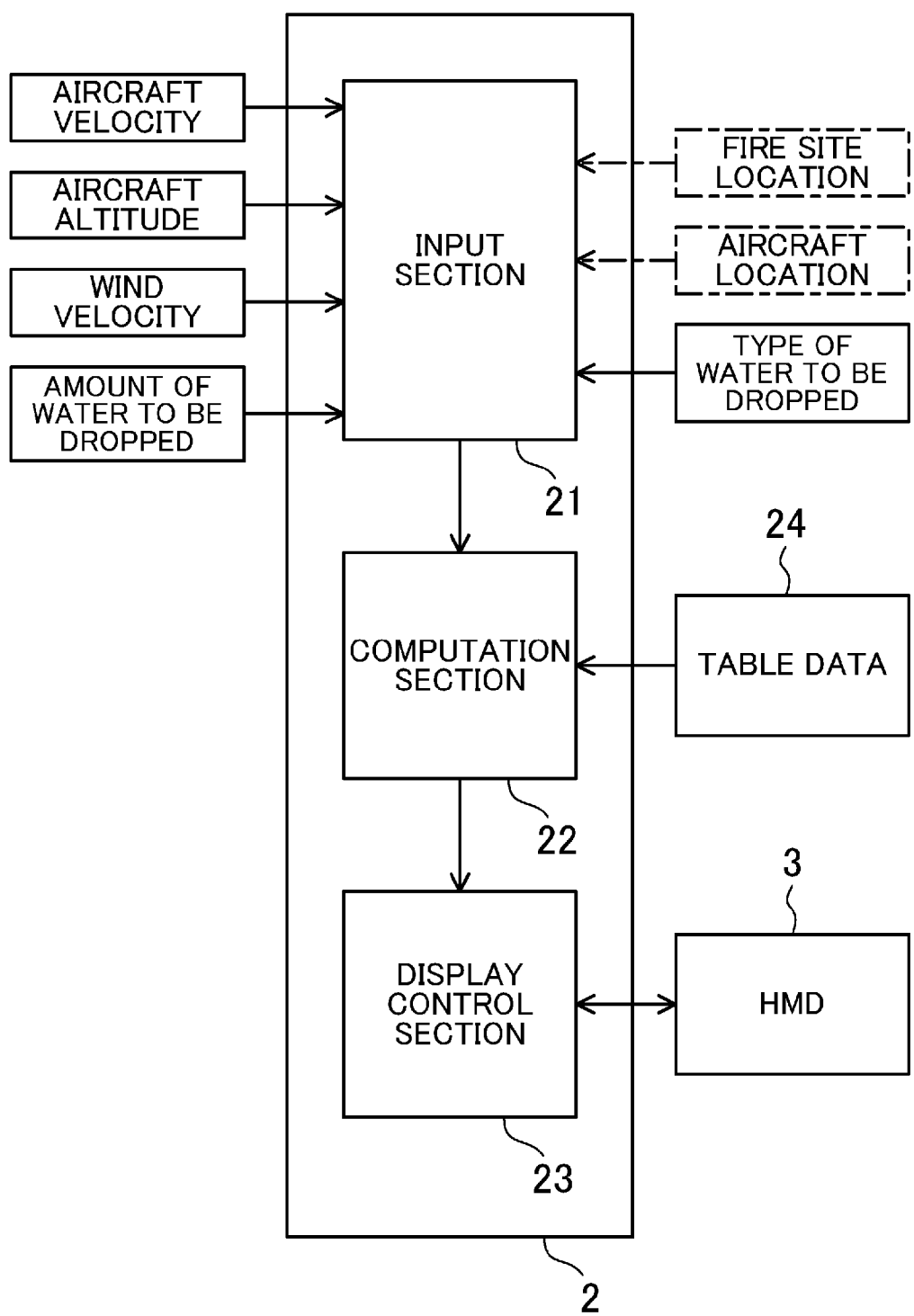

FIG. 3 is a functional block diagram illustrating the configuration of the fire fighting supporting apparatus 2. The fire fighting supporting apparatus 2 includes functional blocks corresponding to an input section 21 to which various types of information offered from a bodywork system of the fire fighting flying boat 1 are input, a computation section 22 configured to compute data concerning the support information based on the input information, and a display control section 23 configured to display the support information on an HMD (i.e., a display) 3 worn by the pilot based on the computation result. The fire fighting supporting apparatus 2 is a computer that has been loaded with software for implementing the functional blocks illustrated in FIG. 3.

Information items input to the input section 21 are information items on the aircraft velocity and aircraft altitude of the fire fighting flying boat 1, the wind velocities (the velocity of wind against the aircraft and the velocity of wind in a direction orthogonal to the aircraft), and the amount of target water to be dropped that is determined by the pilot. The information items on the aircraft velocity, the aircraft altitude, and the amount of the target water correspond to specifications of the aircraft, and the information items on the wind velocities (and wind directions) correspond to atmospheric conditions. The specifications of the aircraft and the atmospheric conditions are related to the water drop conditions on which water is dropped. The water drop conditions are relevant to effective distribution density areas and the locations of the effective distribution density areas as described below. The information items are input to the input section 21 as needed.

Figure 5:
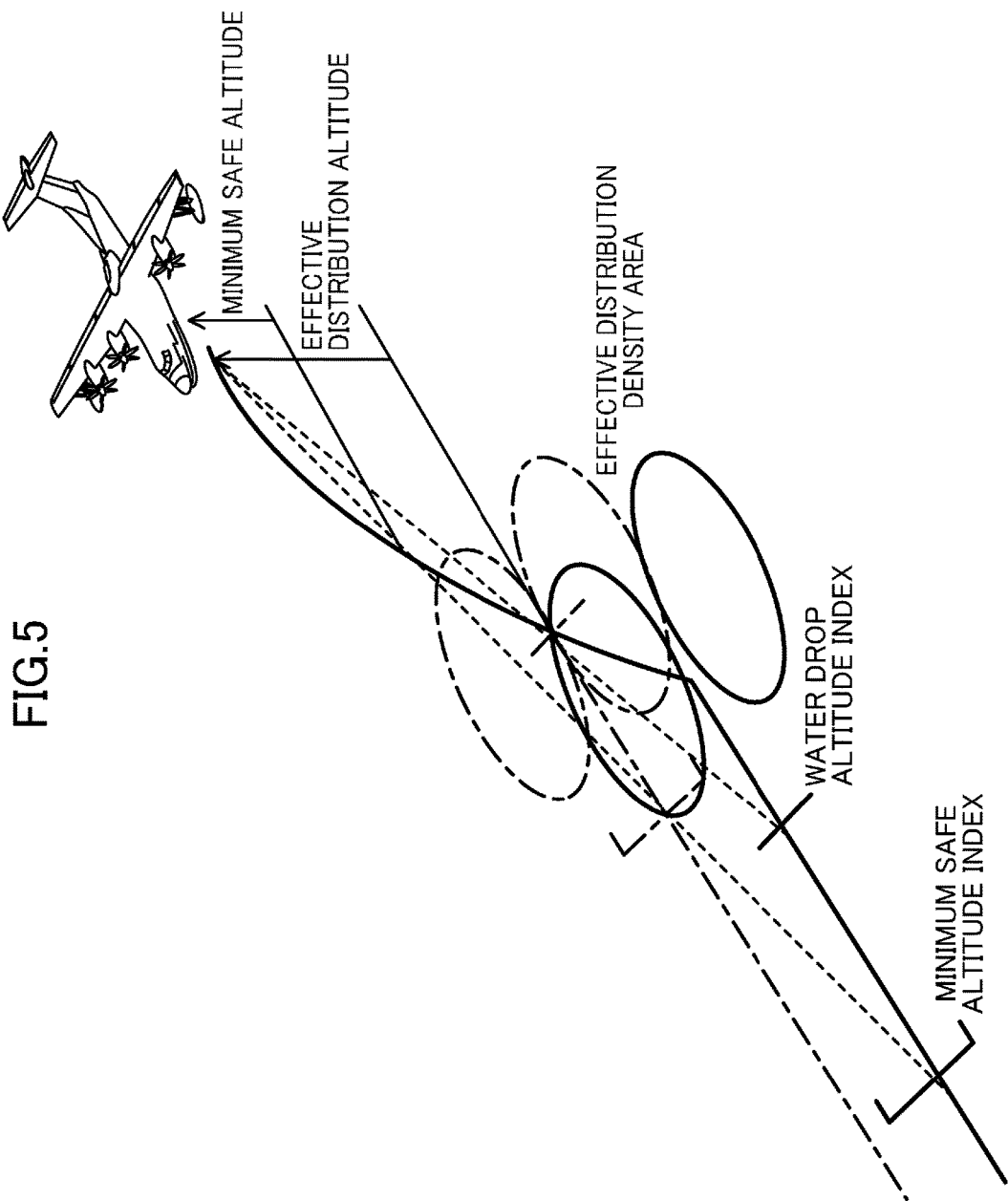

The computation section 22 computes the effective distribution density areas and the locations of the effective distribution density areas based on the input information items. Here, the effective distribution density areas denote areas of the ground surface where when water dropped from the fire fighting flying boat 1 has arrived at the ground surface, water is distributed at a density higher than or equal to a predetermined density. Specifically, liquid, such as water, splits into small water drops while falling, and the water drops are dispersed, thereby distributing the water drops over a predetermined area of the ground surface. With increasing aircraft altitude from which water is dropped, the area where water is spread increases, and the distribution density at which water is distributed decreases. With decreasing aircraft altitude, the area where water is spread decreases, and the distribution density increases. On the other hand, in order to effectively extinguish a fire, water having a distribution density of 1.6 liters per square meter, or a fire extinguishing agent having a distribution density of 0.8 liters per square meter is required. Such a distribution density is referred to as the effective distribution density for extinguishing a fire, and areas of the ground surface where the effective distribution density is ensured correspond to the effective distribution density areas (see also FIG. 5). The inventors of this application conducted, for example, an experiment in which water is dropped in a wind tunnel and a computational fluid dynamics (CFD) analysis to verify the behavior of dropped water. This verification showed that each of the effective distribution density areas varies depending on the aircraft altitude from which water is dropped, and that there exists the aircraft altitude allowing the effective distribution density area to be largest. Furthermore, it was also found that the effective distribution density areas located to the right and left of the point at which water is dropped each have a generally long elliptical shape extending in a direction of travel of the aircraft.

Thus, table data 24 indicating the relationships between various types of water drop conditions and the size or location of the ellipse indicating the effective distribution density area are created based on the results obtained from the CFD analysis and the wind-tunnel experiment, and the fire fighting supporting apparatus 2 allows the table data 24 to be previously stored in a storage means, such as a hard disk drive (HDD) or a flash memory. The CFD analysis is not limited to a specific CFD analysis, and an appropriate CFD analysis can be optionally used.

Each effective distribution density area varies between when water is dropped and when a fire extinguishing agent is dropped. Thus, the storage means may include table data for the dropping of water and table data for the dropping of the fire extinguishing agent. A coefficient may be added to reference table data (e.g., the table data for the dropping of water) without the storage means including a plurality of types of table data to compute the effective distribution density areas for the dropping of the fire extinguishing agent.

The computation section 22 refers to the table data 24 based on the water drop conditions, i.e., the aircraft velocity, the aircraft altitude, the wind directions, and the amount of target water to be dropped, input to the input section 21 to compute the effective distribution density areas (the shape and size of each of the long ellipses) and the locations of the areas of the ground surface. Here, as illustrated in FIG. 3, in a situation where drop material type information identifying whether the distribution material is water or a fire extinguishing agent is input to the input section 21, when water is dropped, the table data for the dropping of water may be referred to as described above to compute the effective distribution density areas and the locations of the effective distribution density areas, and when the fire extinguishing agent is dropped, the table data for the dropping of the fire extinguishing agent may be referred to compute the effective distribution density areas and the locations of the effective distribution density areas.

The water drop conditions input to the input section 21 vary as needed. Thus, the computation section 22 performs a computation depending on the water drop conditions input to the input section 21, and updates the effective distribution density areas and the locations of the effective distribution density areas as needed.

In this example, the fire fighting supporting apparatus 2 includes the table data 24. However, it may include a model expression obtained by modeling the behavior of dropped water instead of the table data, and the computation section 22 may compute the effective distribution density areas and the locations of the effective distribution density areas using the model expression into which the water drop conditions are substituted.

Although not shown in detail, the HMD 3 is a display which is worn on the head of the pilot, through which the view out of the window of the fire fighting flying boat 1 is visible, and on which various types of information can be displayed while being superimposed on the view by the control of the display control section 23. The display control section 23 changes the contents to be displayed on the HMD 3 depending on the orientation of the HMD 3, i.e., as the view visible through the HMD 3 changes with a change in the direction toward which the head of the pilot is oriented.

As described above, the display control section 23 is configured to display the support information on the HMD 3, and the support information is displayed in any one of three modes including a water drop area display mode, a water drop location display mode, and a vector display mode. Any one of the three display modes may be selected. Alternatively, two or three thereof may be configured, and the pilot may optionally select one of them. The three display modes will be sequentially described hereinafter.

(Water Drop Area Display Mode)

Figure 4:
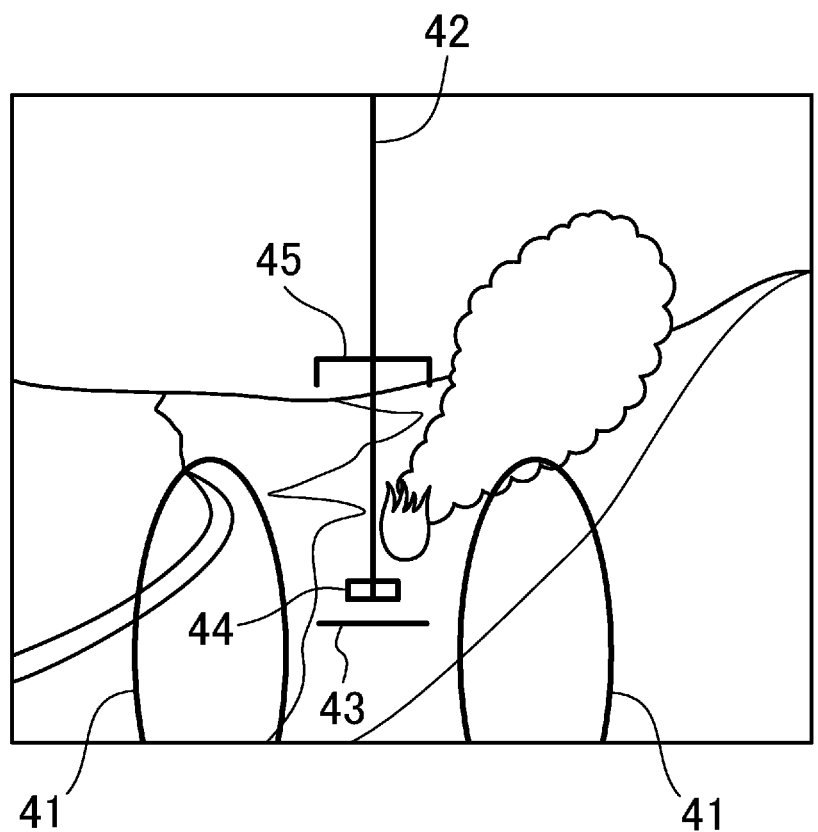

FIG. 4 illustrates an example display of the support information in the water drop area display mode. In the water drop area display mode, the display control section 23 displays long ellipses 41, 41 (in this figure, partially shown) each indicating the above-described effective distribution density area and superimposed on the window view visible through the HMD 3. Furthermore, the display control section 23 displays a water drop line 42, a water drop altitude index 43, and an intermediate point 44 between the centers of the right and left effective distribution density areas. The water drop line 42 shows the direction in which dropped water falls. The reference character 45 denotes an altitude index indicating a minimum safe altitude. The display control section 23 displays these information items on the HMD 3 in real time as the computation section 22 updates the effective distribution density areas and the locations of the effective distribution density areas whenever necessary as described above. The display control section 23 changes, for example, the location of the intermediate point 44 with a change in aircraft altitude. The aircraft altitude at which the water drop altitude index 43 overlaps the intermediate point 44 is an optimum water drop altitude allowing each of the effective distribution density areas to be largest. The display control section 23 further changes the size and location of each ellipse 41 with a change in the water drop conditions, such as the aircraft altitude, and displays the changed ellipse 41 on the HMD 3 (see also the conceptual diagram in FIG. 5).

As such, in the water drop area display mode, the display control section 23 displays the location at which if water is dropped at the present moment, the water arrives on the ground surface and the area where the water is spread, and the pilot can visually recognize the location at which the water arrives and the area where the water is spread. For this reason, the pilot views, through the HMD 3, a fire site that is a target location to which water is to be dropped while flying the fire fighting flying boat 1 such that the fire site overlaps the ellipses 41, 41 and such that the water drop altitude index 43 overlaps the intermediate point 44, and operates the water drop switch 13 at the time when the fire site and the water drop altitude index 43 overlap the ellipses 41, 41 and the intermediate point 44, respectively. This allows an amount of water effective in extinguishing a fire to be precisely dropped to a large area of the fire site. As a result, the fire can be efficiently extinguished.

Latitude/longitude information on the fire site may be previously input to the input section 21, and the display control section 23 may allow the location of the fire site to be displayed on the HMD 3 with a symbol. This allows the pilot to drop water while checking to see the relative position of the symbol of the fire site displayed on the HMD 3 to the ellipses 41, 41. The latitude/longitude information on the fire site may be manually input by, for example, the pilot, and specifically, the fire site may be pointed on the window view that is visually recognized through the HMD 3 by, for example, a pointing device to enable the input of the latitude/longitude information on the fire site. Alternatively, the fire site may be pointed on a map to input the latitude/longitude information on the fire site.

The ellipses 41, the water drop line 42, the water drop altitude index 43, the intermediate point 44, and the minimum safe altitude index 45 illustrated in FIG. 4 are example indicators for displaying the effective distribution density areas and the locations of the effective distribution density areas. Various display patterns can be appropriately used to display the effective distribution density areas and the locations of the effective distribution density areas.

(Water Drop Location Display Mode)

Figure 6:
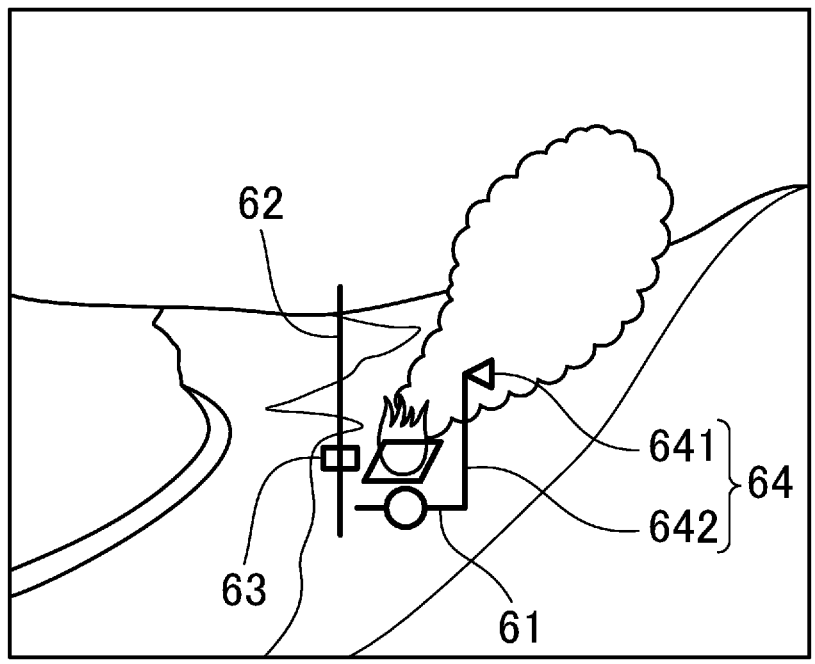

FIG. 6 illustrates an example display of the support information in the water drop location display mode. In the water drop location display mode, latitude/longitude information on the fire site is first previously input to the input section 21, and the computation section 22 computes information on the aircraft location (the latitude and longitude) and the aircraft altitude from each of which water is to be dropped (hereinafter referred to as the water drop target point) as conceptually illustrated in FIG. 7 to effectively drop water to the fire site. Thus, in the water drop location display mode, the display control section 23 displays information on the discrepancy between the water drop target point and each of the aircraft location (the latitude and the longitude) and the aircraft altitude as the support information on the HMD 3.

Specifically, in the water drop location display mode, the location of the fire site, i.e., the latitude and longitude thereof, is first defined. For this reason, when this display mode is used, information on the location of the fire site is input to the input section 21. Furthermore, information on the current location of the fire fighting flying boat 1 (i.e., the aircraft location) is also input to the input section 21 as needed (see FIG. 3). Here, the information on the location of the fire site may be manually input, and as described above, the information on the location of the fire site may be input by utilizing the HMD 3 or a map.

As described above, the table data 24 is referred to based on the water drop conditions input to the input section 21 to enable the computation of the effective distribution density areas and the locations of the effective distribution density areas. For this reason, conversely, the aircraft latitude and longitude and the aircraft altitude, i.e., the water drop target point, from which water can be dropped to the fire site such that each of the effective distribution density areas is largest can be computed based on the defined latitude/longitude information on the fire site. Thus, the computation section 22 refers to the table data 24 based on the water drop conditions input to the input section 21 to compute the water drop target point. Furthermore, the computation section 22 computes the discrepancy between the water drop target point and the current location of the fire fighting flying boat 1, i.e., the aircraft latitude and longitude and the aircraft altitude, in accordance with the computed water drop target point. Here, the water drop target point is changed with a change in aircraft velocity or atmospheric conditions. Thus, whenever necessary, the computation section 22 updates the water drop target point based on the water drop conditions input to the input section 21 as needed, and further updates information on the discrepancy between the water drop target point and the current location of the fire fighting flying boat 1.

In the foregoing manner, the display control section 23 displays information on the discrepancy between the water drop target point and each of the aircraft latitude and longitude and the aircraft altitude as the support information on the HMD 3.

Figure 7:
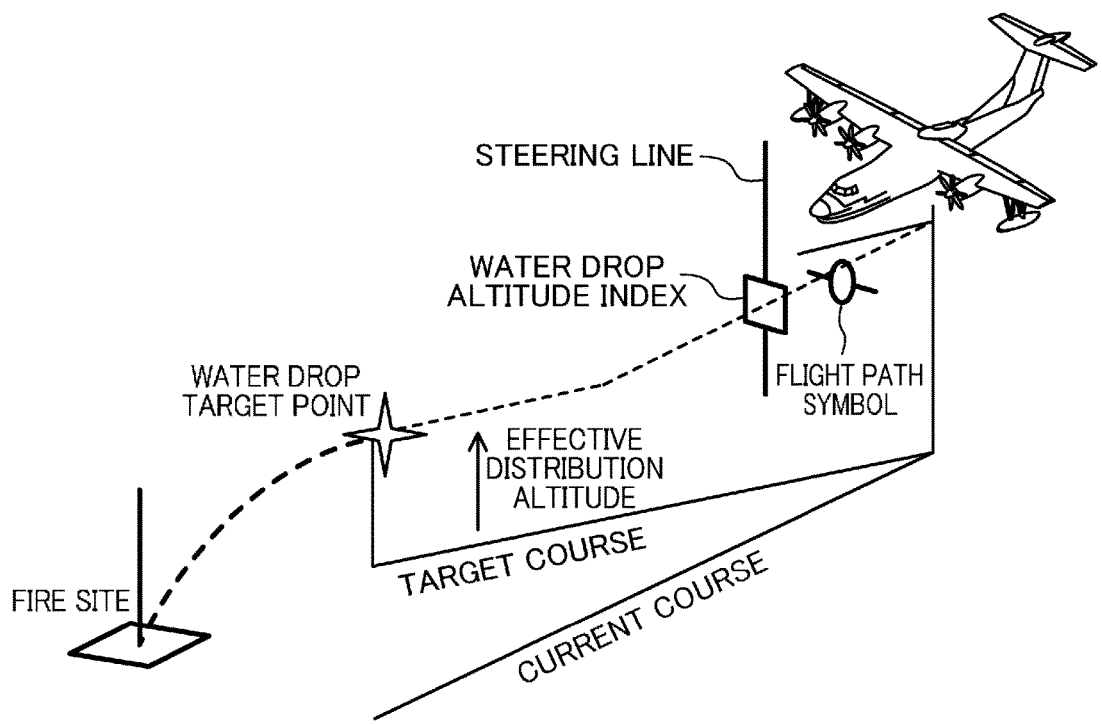

In the water drop location display mode, as conceptually illustrated in FIG. 7, a target course and an angle of descent of the aircraft toward the computed water drop target point are determined, and the fire fighting flying boat 1 is guided toward the water drop target point based on the determined target course and the determined angle of descent of the aircraft. Specifically, in the water drop location display mode, the display control section 23 displays a flight path symbol 61, a steering line 62, and a water drop altitude index 63 in real time such that the flight path symbol 61, the steering line 62, and the water drop altitude index 63 overlap the window view visible through the HMD 3 as illustrated in FIG. 6. The flight path symbol 61 indicates the future location of the fire fighting flying boat 1 determined by the current location of the fire fighting flying boat 1 and information on the course thereof. The steering line 62 relates to the determined target course toward the water drop target point. The water drop altitude index 63 relates to the vertical path angle.

In the water drop location display mode, the display control section 23 displays a release queue 64 indicating the time when water is to be dropped based on information items on the relative distance between the current location of the aircraft and the water drop target point and the aircraft velocity. The release queue 64 relates to the relative distance between the current location of the aircraft and the water drop target point, and thus, can be referred to as information on the discrepancy between the current location of the aircraft and the water drop target point. The release queue 64 includes a triangular arrow 641 and a vertical line 642 along which the arrow 641 moves in this example figure. With decreasing distance from the aircraft to the water drop target point, the arrow 641 of the release queue 64 moves downward, and the situation where the arrow 641 has reached the lowest end of the vertical line 642 shows that the aircraft has arrived at the water drop target point. When the fire fighting flying boat 1 arrives within a tolerance area where water may be dropped, the display control section 23 may allow the release queue 64 to flash, change the color in which the release queue 64 is displayed, or allow the release queue 64 to flash while changing the color.

Thus, in the water drop location display mode, the pilot flies the fire fighting flying boat 1 such that the flight path symbol 61 overlaps the steering line 62 and the water drop altitude index 63, and further operates the water drop switch 13 in response to the displayed release queue 64. Since, in the water drop location display mode, information on the discrepancy between the water drop target point and the current location of the aircraft is merely offered to the pilot, the pilot can optionally determine, for example, the direction of entry into the fire site or the velocity of entry thereinto. Thus, the pilot operates the water drop switch 13 in accordance with indications of the flight path symbol 61, the steering line 62, the water drop altitude index 63, and the release queue 64 that are displayed on the HMD 3 to enable the dropping of water in the vicinity of the water drop target point. This allows an amount of water effective in extinguishing the fire to be precisely dropped to a broad area of the fire site, and enables efficient fire fighting. In the water drop location display mode, the optimum location at which water is to be dropped and the optimum altitude from which water is to be dropped are previously determined, and while the fire fighting flying boat 1 is guided to the optimum location and altitude, the time when water is to be dropped is also indicated. This eliminates the need that the pilot visually recognize the fire site while performing a water drop operation, and thus, reduces the burdens on the pilot.

In the water drop location display mode, the water drop target point is computed, and for this reason, instead of the pilot operating the water drop switch 13, the aircraft may output an actuation signal to the actuators 12 at the time when the fire fighting flying boat 1 has arrived at the water drop target point, thereby enabling automatic dropping of water. Alternatively, when two requirements that the pilot have operated the water drop switch 13 and that the fire fighting flying boat 1 have arrived at the water drop target point are satisfied, an actuation signal may be output to the actuators 12 to drop water. In this case, if the pilot continues pressing the water drop switch 13 in the vicinity of the water drop target point, water is automatically dropped when the fire fighting flying boat 1 has arrived at the water drop target point. This operation can be referred to as the semiautomatic water drop operation. Such an automatic water drop operation or such a semiautomatic water drop operation significantly reduces the burdens on the pilot while enabling the precise dropping of water.

The flight path symbol 61, the steering line 62, the water drop altitude index 63, and the release queue 64 illustrated in FIG. 6 are example indicators for displaying the discrepancy between the water drop target point and the current location of the fire fighting flying boat 1. To display the discrepancy between the water drop target point and the current location of the fire fighting flying boat 1, various indications can be appropriately used.

(Vector Display Mode)

Figure 8:
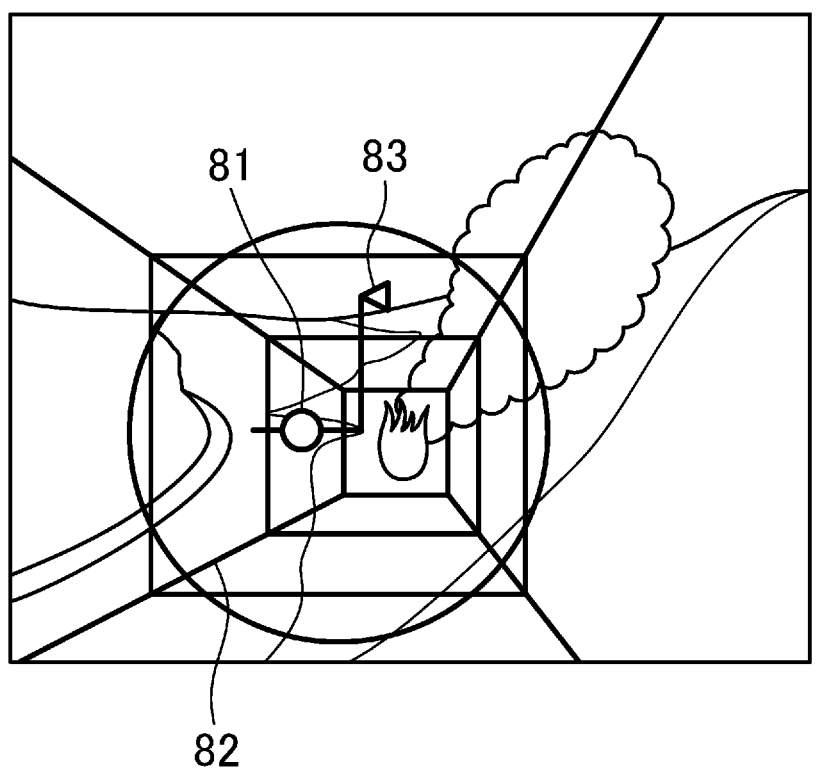

FIG. 8 illustrates an example display of support information in the vector display mode. In the vector display mode, while the computation section 22 computes the water drop target point in a manner similar to that in the water drop location display mode, the computation section 22 determines the flight path to the water drop target point unlike the water drop location display mode, and the display control section 23 displays the determined flight path as the support information on the HMD 3.

Specifically, in the vector display mode, as described above, the information on the location of the fire site and the information on the current location of the aircraft are input to the input section 21, and the computation section 22 determines the water drop target point and the flight path to the water drop target point based on the input information. In determining the flight path, the pilot may previously designate the direction of entry into the fire site or the velocity of entry thereinto.

The display control section 23 displays the determined flight path as the support information on the HMD 3. As illustrated in FIG. 8, in the vector display mode, the display control section 23 displays a flight path symbol 81, and displays the determined path in the form of, for example, a tunnel extending in the direction of travel of the fire fighting flying boat 1. Such an indicator is hereinafter referred to as a tunnel 82. The flight path symbol 81 and the tunnel 82 are displayed in real time to overlap the window view visible through the HMD 3. Also in the vector display mode, the display control section 23 displays a release queue 83 similar to that described above.

The pilot flies the fire fighting flying boat 1 such that the flight path symbol 81 passes through the tunnel 82 at a determined velocity in the vector display mode. This allows the fire fighting flying boat 1 to arrive at the water drop target point. Simultaneously, the pilot performs a water drop operation in accordance with the indication of the release queue 83 as described above. This allows an amount of water effective in extinguishing the fire to be precisely dropped to a broad area of the fire site, and enables efficient fire fighting. Also in the vector display mode, in a manner similar to that in the water drop location display mode, the optimum location at which water is to be dropped and the optimum altitude from which water is to be dropped are previously determined, and while the fire fighting flying boat 1 is guided to the optimum location and altitude, the time when water is to be dropped is also indicated. This reduces the burdens on the pilot.

The automatic water drop operation or the semiautomatic water drop operation in which the pilot operates the water drop switch 13 may be used as described above without manually dropping water.

The flight path symbol 81, the tunnel 82, and the release queue 83 illustrated in FIG. 8 are example indicators for displaying the path of the fire fighting flying boat 1 and the time when water is to be dropped. To display the path of the fire fighting flying boat 1 and the time when water is to be dropped, various indications can be appropriately used.

As such, the fire fighting supporting apparatus 2 offers, to the pilot, not only the location at which, for example, dropped water arrives, but also information on the effective distribution density areas relating to the drop altitude. This allows the pilot to precisely and efficiently distribute, for example, water to the fire site, and helps increase the efficiency of fire fighting. The utilization of the concepts of the effective distribution density areas prevents the altitude of the fire fighting flying boat 1 from being lower than required. This helps ensure the safety of fire fighting.

The above-described fire fighting supporting apparatus 2 includes the HMD 3 as the display. However, for example, an HUD may be used as the display. Alternatively, map information may be displayed on the display, such as a flat panel display, and the support information may be displayed to overlap the map information.

The aircraft including the fire fighting supporting apparatus 2 herein is not limited to the fire fighting flying boat. For example, a fire helicopter may include the fire fighting supporting apparatus 2.

The distribution supporting apparatus herein can be not only utilized to extinguish a fire at the fire site but also broadly utilized to distribute distribution material, such as liquid, foam, or powder, to the ground surface from an aircraft. In other words, cases where distribution material should be efficiently distributed are not limited to fire fighting. Examples of such cases include various operations in which distribution material is dropped from an aircraft, such as an operation for distributing chemicals, such as agricultural chemicals, to a broad area. The concepts of the effective distribution density areas can be applied to such operations. The effective distribution density areas vary depending on, for example, the type of distribution material and the purpose of the distribution. In other words, the distribution supporting apparatus herein can be utilized to distribute, for example, chemicals.

As described above, the apparatus and method for supporting distribution from an aircraft herein enables the efficient distribution of distribution material, and can be utilized for fire fighting for, e.g., a forest fire or other various distribution operations.

What is claimed is:

1. An aerial distribution supporting apparatus which, when distribution material is distributed over a target site on a ground surface from an aircraft, offers support information to a pilot dropping the distribution material to efficiently distribute the distribution material, the apparatus comprising:

an input section to which information items on at least a velocity and an altitude of the aircraft and a wind velocity are input, the aircraft including a tank to store the distribution material;

a computation section configured to compute a location at which the distribution material dropped from the aircraft arrives on the ground surface and a density distribution of the distribution material on the ground surface based on the information items input to the input section, the distribution material being dropped from the tank, the distribution material splitting into small liquid drops while falling, the small liquid drops being dispersed; and a display control section configured to display, on a display, the support information relating to the location and density distribution computed by the computation section, wherein the distribution material is water or a fire extinguishing agent to be distributed over a fire site, with increasing aircraft altitude from which the distribution material is dropped, an area of the ground surface where the distribution material is spread increases, and a density of the distribution material on the ground surface decreases, while, with decreasing aircraft altitude from which the distribution material is dropped, the area of the ground surface where the distribution material is spread decreases, and the density of the distribution material on the ground surface increases, the distribution material having a density higher than or equal to a predetermined density is required to effectively extinguish a fire, an information item on a location of the fire site that is the target site is further input to the input section, the computation section computes, based on the input information items, a drop location and a drop altitude from which the distribution material is to be dropped, which enable distribution of the distribution material over the fire site at a density higher than or equal to a density effective in extinguishing a fire, and which allow an area where the distribution material is distributed to be maximum, and the display control section displays, on the display, information items on the drop location and the drop altitude from which the distribution material is to be dropped as the support information.

2. The apparatus of claim 1, wherein
an information item on an aircraft location is further input to the input section, and
the display control section displays, on the display, an information item on discrepancies between the aircraft location and the computed drop location and between the aircraft altitude and the computed drop altitude as the support information in real time.

3. The apparatus of claim 2 further comprising:
a dropper configured to drop the distribution material when the aircraft has arrived at the drop location and the drop altitude.

4. The apparatus of claim 1, wherein
an information item on an aircraft location is further input to the input section,
the computation section further computes a path through which the aircraft reaches the drop location and the drop altitude, and
the display control section displays, on the display, information items on the computed path and a time when the distribution material is to be dropped as the support information in real time.

5. The apparatus of claim 4, further comprising:
a dropper configured to drop the distribution material when the aircraft has arrived at the drop location and the drop altitude.

6. The apparatus of claim 1, wherein
the computation section computes, based on the input information items and previously determined table data, the location at which the distribution material arrives and the density distribution.

7. An aerial distribution supporting apparatus which, when distribution material is distributed over a target site on a ground surface from an aircraft, offers support information to a pilot dropping the distribution material to efficiently distribute the distribution material, the apparatus comprising:
an input section to which information items on at least a velocity and an altitude of the aircraft and a wind velocity are input, the aircraft including a tank to store the distribution material;
a computation section configured to compute a location at which the distribution material dropped from the aircraft arrives on the ground surface and a density distribution of the distribution material on the ground surface based on the information items input to the input section, the distribution material being dropped from the tank, the distribution material splitting into small liquid drops while falling, the small liquid drops being dispersed; and
a display control section configured to display, on a display, the support information relating to the location and density distribution computed by the computation section, wherein
the distribution material is water or a fire extinguishing agent to be distributed over a fire site,
with increasing aircraft altitude from which the distribution material is dropped, an area of the ground surface where the distribution material is spread increases, and a density of the distribution material on the ground surface decreases, while, with decreasing aircraft altitude from which the distribution material is dropped, the area of the ground surface where the distribution material is spread decreases, and the density of the distribution material on the ground surface increases,
the distribution material having a density higher than or equal to a predetermined density is required to effectively extinguish a fire,
the computation section computes an effective distribution density area in which the distribution material is distributed over the ground surface at a density higher than or equal to the predetermined density, and a location of the effective distribution density area, and
the display control section displays, on the display, the effective distribution density area obtained by dropping the distribution material at a present moment, and the location of the effective distribution density area as the support information in real time.

8. The apparatus of claim 7, wherein
the computation section computes, based on the input information items and previously determined table data, the location at which the distribution material arrives and the density distribution.

9. An aerial distribution supporting method in which, when distribution material is distributed over a target site on a ground surface from an aircraft, support information is offered to a pilot dropping the distribution material to efficiently distribute the distribution material, the method comprising:
inputting information items on at least a velocity and an altitude of the aircraft, a wind velocity, and a location of a fire site that is the target site, the aircraft including a tank to store the distribution material;
computing, based on the input information items, a drop location and a drop altitude from which the distribution material is to be dropped, which enable distribution of the distribution material having a density higher than or equal to a density effective in extinguishing a fire over the fire site, and which allow an area where the distribution material is distributed to be maximum, the distribution material being dropped from the tank, the distribution material splitting into small liquid drops while falling, the small liquid drops being dispersed; and displaying, on a display, information items relating to the drop location and the drop altitude from which the distribution material is to be dropped as the support information, wherein the distribution material is water or a fire extinguishing agent to be distributed over the fire site, with increasing aircraft altitude from which distribution material is dropped, the area of the ground surface where the distribution material is spread increases, and the density of the distribution material on the ground surface decreases, while, with decreasing aircraft altitude from which distribution material is dropped, the area of the ground surface where the distribution material is spread decreases, and the density of the distribution material on the ground surface increases, and the distribution material having a density higher than or equal to a predetermined density is required to effectively extinguish a fire.

10. An aerial distribution supporting method in which, when distribution material is distributed over a target site on a ground surface from an aircraft, support information is offered to a pilot dropping the distribution material to efficiently distribute the distribution material, the method comprising:

inputting information items on at least a velocity and an altitude of the aircraft, and a wind velocity, the aircraft including a tank to store the distribution material;

computing, based on the input information items, an effective distribution density area in which the distribution material is distributed over the ground surface at a density higher than or equal to a predetermined density, and a location of the effective distribution density area, the distribution material being dropped from the tank, the distribution material splitting into small liquid drops while falling, the small liquid drops being dispersed; and displaying, on a display, the effective distribution density area obtained by dropping the distribution material at a present moment, and the location of the effective distribution area as the support information in real time, wherein the distribution material is water or a fire extinguishing agent to be distributed over a fire site, with increasing aircraft altitude from which the distribution material is dropped, an area of the ground surface where the distribution material is spread increases, and a density of the distribution material on the ground surface decreases, while, with decreasing aircraft altitude from which the distribution material is dropped, the area of the ground surface where the distribution material is spread decreases, and the density of the distribution material on the ground surface increases, and the distribution material having a density higher than or equal to the predetermined density is required to effectively extinguish a fire.

* * * * *